US008290688B2

(12) United States Patent
Watson

(10) Patent No.: US 8,290,688 B2
(45) Date of Patent: Oct. 16, 2012

(54) EXHAUST GAS OXYGEN SENSOR DIAGNOSTIC METHOD AND APPARATUS

(75) Inventor: Iain Watson, Coventry (GB)

(73) Assignee: DENSO Corporation, Kariya-city (JP)

( * ) Notice: Subject to any disclaimer, the term of this patent is extended or adjusted under 35 U.S.C. 154(b) by 649 days.

(21) Appl. No.: 12/585,024

(22) Filed: Sep. 1, 2009

(65) Prior Publication Data

US 2011/0054764 A1 Mar. 3, 2011

(51) Int. Cl.

| | |
|---|---|
| ***G06F 19/00*** | (2011.01) |
| ***F02D 41/14*** | (2006.01) |
| ***G01M 15/00*** | (2006.01) |

(52) U.S. Cl. ........ 701/109; 701/114; 123/688; 123/690; 73/114.73

(58) Field of Classification Search ............... 123/198 F, 123/481, 672, 679, 688, 690, 703; 701/101-104, 701/109, 114; 73/23.31, 23.32, 114.72, 114.73; 702/182, 183, 185

See application file for complete search history.

(56) References Cited

U.S. PATENT DOCUMENTS

| | | | | |
|---|---|---|---|---|
| 4,648,370 | A * | 3/1987 | Kobayashi et al. | 123/682 |
| 5,168,700 | A * | 12/1992 | Furuya | 123/688 |
| 5,394,691 | A * | 3/1995 | Seki | 60/276 |
| 5,728,941 | A | 3/1998 | Yamamoto et al. | |
| 6,830,027 | B1 * | 12/2004 | Segawa et al. | 123/198 F |
| 6,968,268 | B2 | 11/2005 | Yamada et al. | |
| 7,387,011 | B2 * | 6/2008 | Fujiki et al. | 123/688 |
| 7,558,667 | B2 * | 7/2009 | Kida | 701/114 |
| 7,599,786 | B2 * | 10/2009 | Utsumi et al. | 701/109 |

FOREIGN PATENT DOCUMENTS

| | | |
|---|---|---|
| JP | 06-336948 | 12/1994 |

* cited by examiner

*Primary Examiner* — Willis R Wolfe, Jr.
(74) *Attorney, Agent, or Firm* — Nixon & Vanderhye P.C.

(57) ABSTRACT

An internal combustion engine includes an exhaust system, an oxygen sensor in the exhaust system and a sensor malfunction monitor. In order to maintain operation during a fuel cut-off situation, the sensor malfunction monitor is arranged to control the fuel cut-off sequencing.

21 Claims, 5 Drawing Sheets

EXHAUST GAS OXYGEN SENSOR DIAGNOSTIC METHOD AND APPARATUS

BACKGROUND

1. Technical Field

Example embodiments of the present invention relate to a method and apparatus monitoring oxygen sensor operation for an internal combustion engine.

2. Related Art

As a part of the monitoring systems in a modern internal combustion engine, the response characteristics of the oxygen sensors are monitored to ensure the correct operation of the sensors. A known response monitor for a heated exhaust gas oxygen (HEGO) sensor can be operable to monitor the HEGO response during fuel cut (FC) operation. A fuel cut operation can, for example, be triggered when one or more or all cylinders in the engine have entered into fuel cut. In some known systems, fuel cut is entered on a sequential cylinder basis. This means that the fuel cut does not occur on all cylinders at the same time. Instead, individual cylinders enter fuel cut with a calibratable delay. In this known system, the next cylinder to enter fuel cut is not deterministic, which means that any cylinder across cylinder banks can be selected as the next cylinder to enter fuel cut depending on the engine speed. This slow and/or random operation means that a robust HEGO response diagnostic is difficult to achieve.

There is a need to provide a robust approach to the monitoring of a sensor response in a fuel cut situation.

SUMMARY

An example embodiment of the invention can provide a method of managing internal combustion engine operation for sensor monitoring, the method comprising: initiating an oxygen sensor monitor period in which an oxygen sensor is monitored; and during the sensor monitor period, controlling a rate and sequence of fuel cut to a selected bank of cylinders of the internal combustion engine (and hence, fuel cut to selected fuel injectors corresponding respectively to the bank of cylinders) in response to the oxygen sensor monitoring.

An engine control unit for an internal combustion engine, the engine control unit comprising a computer processor that executes injection control logic and oxygen sensor monitor logic, wherein the engine control unit, in response to initiation of an oxygen sensor monitor period in which an oxygen sensor is monitored via execution of the oxygen sensor monitor logic by the computer processor, is operable during the oxygen sensor monitor period, to control a rate and sequence of fuel cut to cylinder of a selected bank of the internal combustion engine via execution of the injection control logic by the computer processor in response to the oxygen sensor monitoring.

An internal combustion engine system can be provided that comprises an internal combustion engine and such an engine control unit.

A computer readable storage medium readable by a computer, tangibly storing program code executable by the computer to perform a method for managing internal combustion engine operation for oxygen sensor monitoring, the method comprising: initiating a sensor monitor period in which an oxygen sensor is monitored; and during the sensor monitor period, controlling a rate and sequence of fuel cut to cylinders of a selected bank of the internal combustion engine in response to the oxygen sensor monitoring.

BRIEF DESCRIPTION OF THE FIGURES

Specific example embodiments of the present invention will now be described by way of example only with reference to the accompanying drawings.

DETAILED DESCRIPTION

An example embodiment of the invention is described with reference to the accompanying drawings which illustrate an internal combustion engine that includes an exhaust system, an oxygen sensor in the exhaust system, and a sensor malfunction monitor. In order to maintain operation during a fuel cut-off situation, the sensor malfunction monitor is arranged to control the fuel cut-off sequencing.

Figure 1:
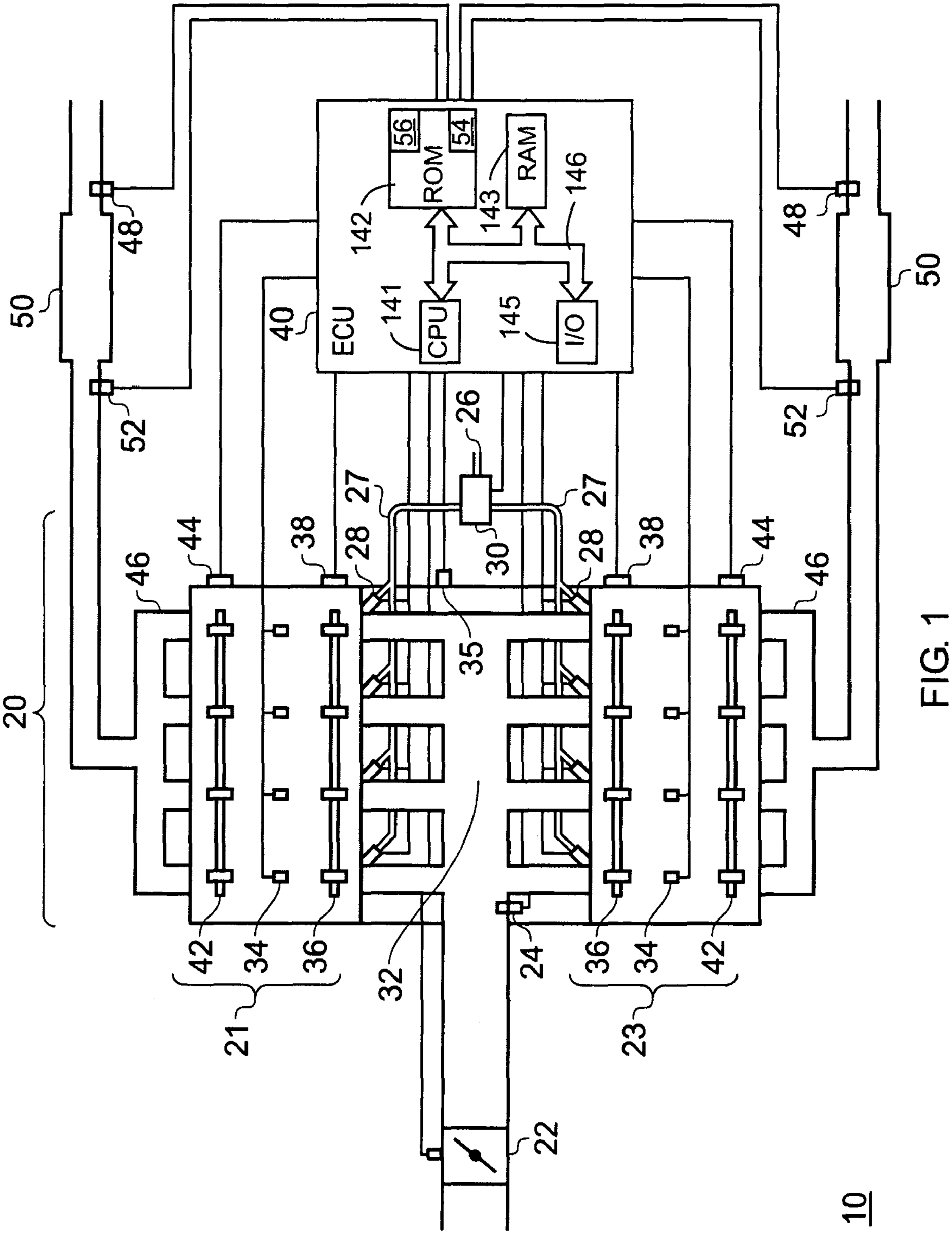
FIG. 1 is a schematic representation of an example embodiment of an internal combustion engine according to the present invention.

FIG. 1 provides a schematic overview of an engine system 10 including an internal combustion engine 20. The internal combustion engine 20 represented in FIG. 1 is an eight cylinder gasoline engine arranged in two banks 21 and 23 of four cylinders each. The engine system is controlled by an engine management system that includes an engine control unit (ECU) 40 and various sensors and control subsystems of the engine system 10 to which the ECU 40 is connected. An electronic control unit (ECU) 40 may include a central processing unit (CPU) 141 for executing programmed logic (thereby forming programmed logic circuitry), a ROM 142 for storing control data and control programs such as injector control logic 54 and the oxygen sensor control logic 56 to respectively form an injector controller and an oxygen sensor monitor, a RAM 143 for storing various data, an input/output circuit 145 for communicating data signals from sensors, and a bus line 146. The CPU 141 of the ECU 40 executes, for example, the procedure of the programmed logic shown in more detail by FIGS. 2-4, thereby forming programmed logic circuitry. The ECU 40 controls the operation of a throttle 22 at the intake side of the engine. A manifold pressure sensor 24 in an intake manifold 32 provides control signals to the ECU 40. A fuel injector 28 for each cylinder is connected to fuel supply lines 27. In the present example, the fuel injectors are represented as direct fuel injectors that inject fuel directly into each cylinder. In another example, the fuel injectors could be port injectors that inject fuel into the intake port of a cylinder. A pressure regulator 30 is used to control fuel pressure from a fuel supply line 26 to the fuel supply lines 27. The individual injectors 28 receive control signals from the ECU 40 to control the timed injection of fuel. Spark plugs 34 receive ignition timing (IGT) signals from the ECU 40.

The engine control unit 40 receives signals from a crank sensor 35 that indicate rotation of the crankshaft of the engine. The engine control unit 40 also receives signals from camshaft sensors 38 and 44 for each bank 21/23 indicating the timing of the rotation of intake and exhaust camshafts 36 and 42, respectively, of each bank 21/23. For each bank 21/23, the intake and exhaust camshafts respectively control intake and exhaust valves (not shown). The engine control unit 40 receives other signals from other sensors (not shown) in a conventional manner such that the engine control unit is able to monitor operating parameters such as engine speed, engine load, etc. The engine control unit 40 also receives control signals from a universal heated exhaust gas oxygen (UHEGO) sensor 48 and a heated exhaust gas oxygen (HEGO) sensor 52 for the exhaust system of each bank 21/23. In the example shown, the UHEGO sensor 48 and the HEGO sensor 52 are located either side of a catalytic converter 50, downstream of the exhaust manifold 46 of each bank 21/23. However, in other examples the positioning of UHEGO sensor 48 and/or the HEGO sensor 52 could be different. The ECU 40 includes the injector control logic 54 and the oxygen sensor control logic 56 that are described in more detail with respect to FIGS. 2 to 4. The CPU 141 of the ECU 40 executes, for example, the injector control logic 54 and the oxygen sensor control logic 56 shown in detail by FIGS. 2-4, thereby respectively forming injector control programmed logic circuitry and the oxygen sensor control programmed logic circuitry.

It should be noted that an eight cylinder, two bank engine is illustrated in FIG. 1 for ease of explanation only, and that another example embodiment of the invention may include eight or another number of cylinders. For example, the internal combustion engine could include 6 cylinders or 10 or 12 cylinders, (by way of example only) arranged in two banks of three cylinders (possibly in any one of a straight 6, a V6 or a boxer 6 configuration). In a banked cylinder arrangement, each bank will typically be provided with respective exhaust systems, but could have a manifold configuration leading to a common exhaust system.

Figure 2:
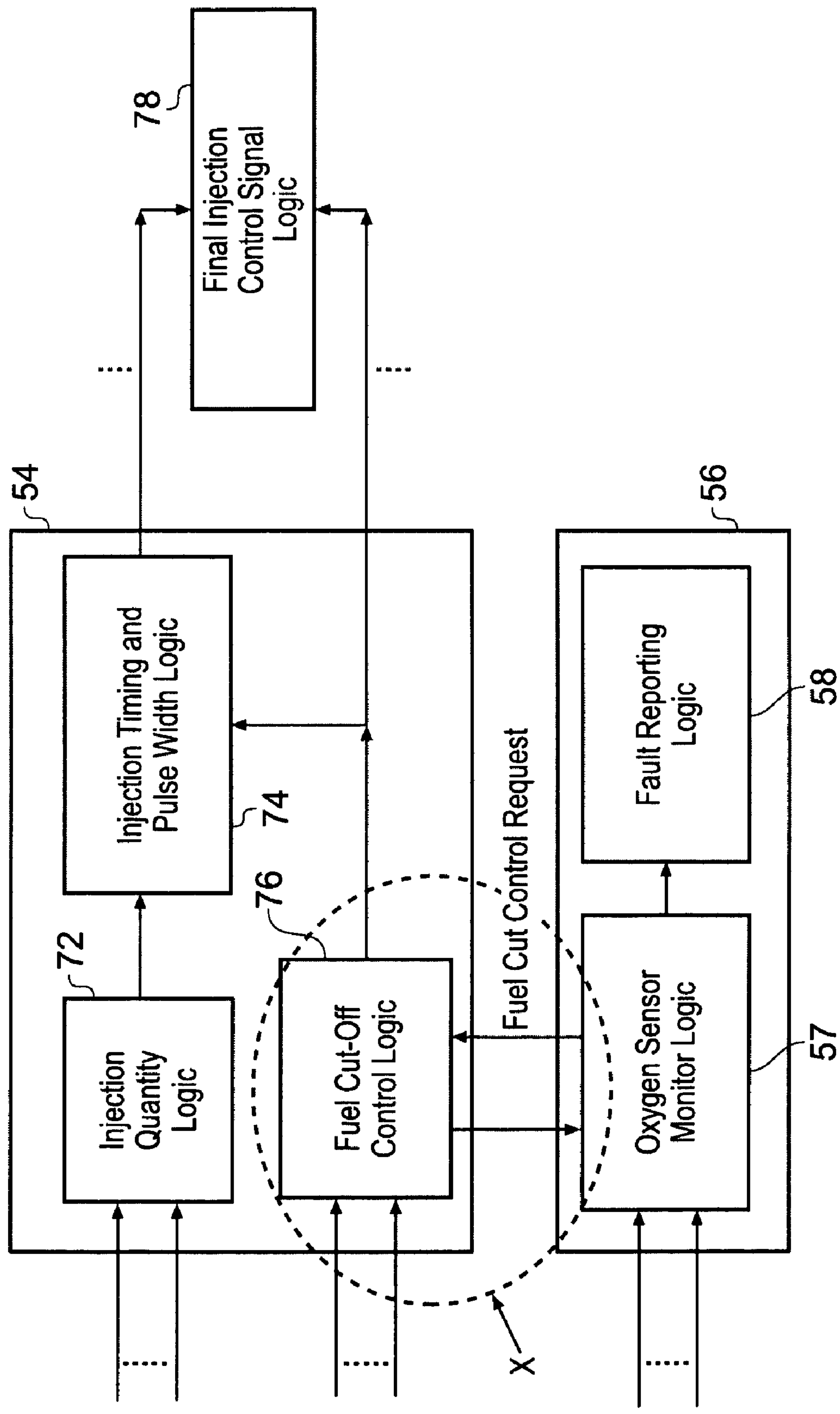
FIG. 2 is a block diagram of part of an example of an engine control unit for an example of embodiment of the invention.

FIG. 2 is a schematic block diagram representing logic elements of the injector control logic 54 and the oxygen sensor control logic 56 illustrated in FIG. 1. FIG. 2 illustrates an example, only, of various logic blocks that can be included in an example embodiment of the injector control logic 54 and the oxygen sensor control logic 56. As noted above, the injector control logic 54 and the oxygen sensor control logic 56 (and their respective logic components illustrated in FIG. 2 for example) may be stored in a computer readable storage medium such as the ROM 142 or RAM 143, and read out and executed by the CPU 141.

As illustrated in FIG. 2, the injector control logic 54 can include injection quantity logic 72 that determines injection quantity values for controlling the injector according to varying engine operating condition requirements. The injector quantity logic 72 can include initial start injection quantity logic that determines an initial injection quantity and after-start injection quantity logic to compute injection quantities that are operable after an initial start.

The after-start injection quantity logic can include various logical units including base injection quantity logic, air-fuel ratio (AFR) logic that provides AFR feedback control based on various measured parameters within the engine system and fuel compensation logic that compensates fuel amounts according to various operating parameters, such as, for example, fuel pressure compensation, injector temperature compensation, purge control compensation, etc.

The injection quantity logic 72 provides signals to injection timing and pulse width logic 74 that computes injection timings and injection pulse widths to provide signals to respective final injection control signal logic 78 for each injector 28 to provide the required injection quantity to that injector 28 dependent on current operating parameters.

Fuel cut-off (FCO) control logic 76 provides fuel cut-off in response to, for example, an overrun situation, an overspeed situation, an ignition fail situation, an ignition brake situation, or a torque reduction situation. The fuel cut-off control logic 76 provides signals to the injection timing and pulse width logic 74 and to the final injection control signal logic 78 for each injector 28 for cutting injection to respective cylinders of the internal combustion engine in accordance with a fuel cut-off strategy in response to the output from the fuel cut-off control logic 76. In normal operation, the fuel cut-off strategy can be, for example, to cut-off the fuel to all cylinders at once. Alternatively, the fuel cut-off strategy in response to a deceleration fuel cut-off strategy to cut cylinders out sequentially. However, in such situations, the cylinder order can be random and can be designed to minimize an effect on driveability.

FIG. 2 also illustrates that the oxygen sensor control logic 56 of the oxygen sensor monitor includes oxygen sensor monitor logic 57 and oxygen sensor fault reporting logic 58. The oxygen sensor monitor logic 57 is operable to monitor the operation of one or more of the oxygen sensors in the exhaust system of the engine system and to log any faults identified using the fault reporting logic 58.

In an example embodiment of the present invention, the oxygen sensor monitor logic 57 is further operable to provide a fuel cut-off request to the fuel cut-off control logic 76 for control of the injector cut-off in a fuel cut-off situation if the timing of the operation of the oxygen sensor monitor coincides with a fuel cut-off situation. This will be described in more detail in the following with reference to FIGS. 3 and 4. The fuel cut-off control logic 76 and the interaction with the oxygen sensor monitor logic 57 will be described in more detail with reference to FIG. 4 are represented by the dashed lines at X in FIG. 2.

Figure 3:
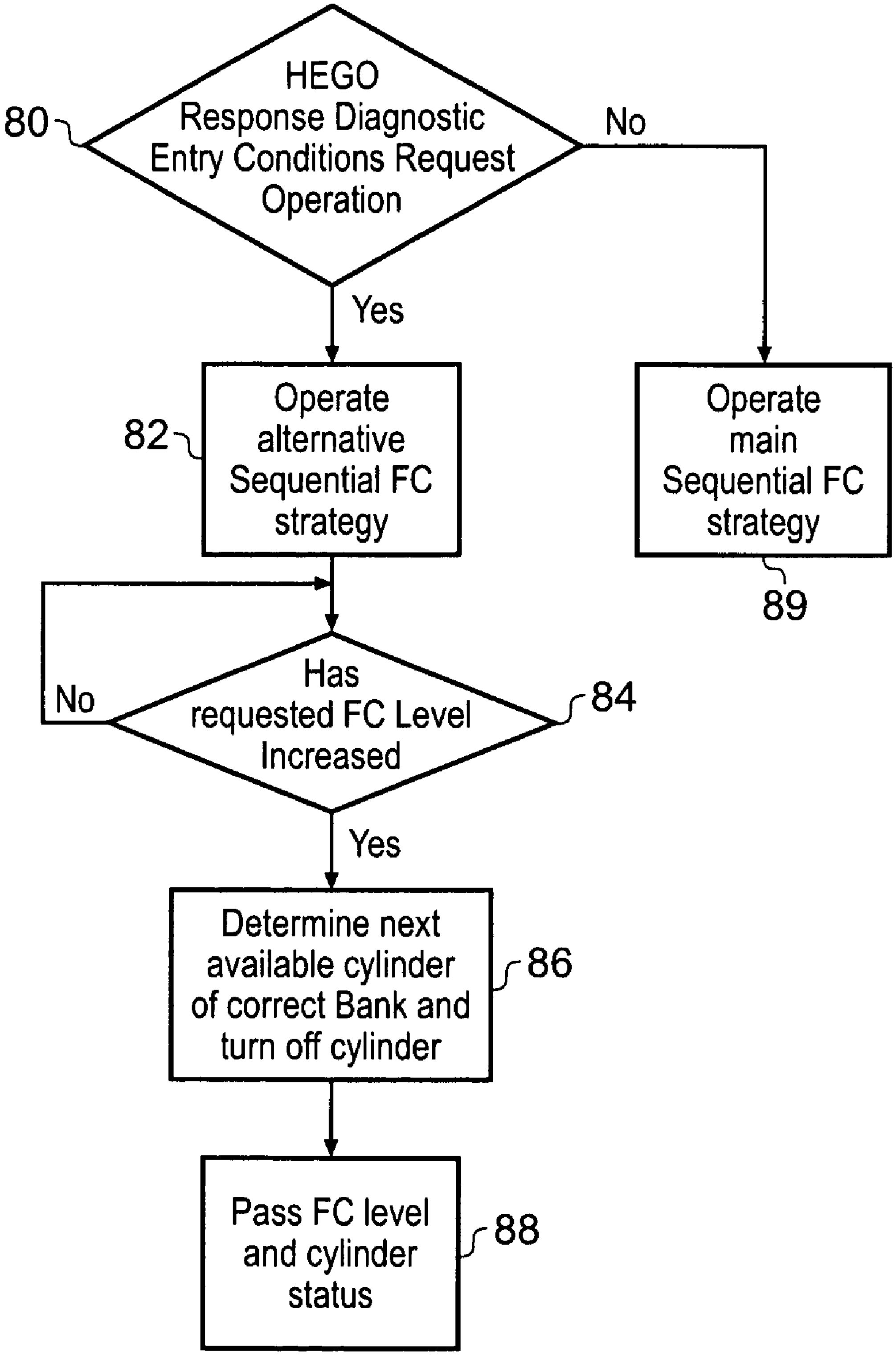
FIG. 3 is a flow diagram illustrating alternative fuel cut-off strategies.
Figure 4:
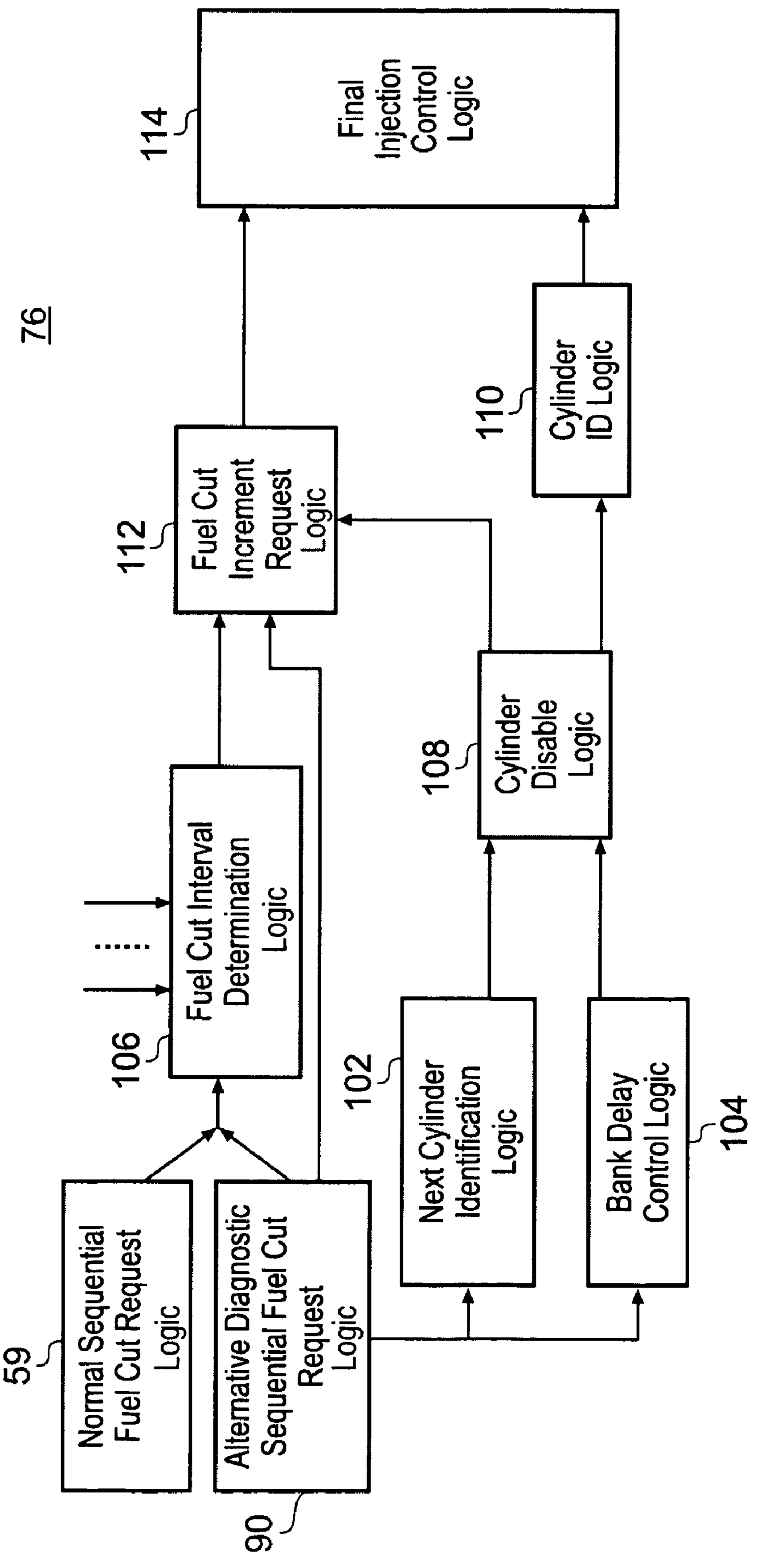
FIG. 4 is a schematic block diagram illustrating an example embodiment of a fuel cutoff logic.

FIG. 3 is a flow diagram illustrating that alternative fuel cut-off strategies can be used depending on whether oxygen sensor diagnostics are to be performed.

In step 80, a decision is made as to whether oxygen sensor monitoring is to be performed. As represented in FIG. 3, the oxygen sensor monitoring is in the form of response testing for the heated exhaust gas oxygen (HEGO) sensor 48 illustrated in FIG. 1. In an example embodiment of the present invention, the HEGO response diagnostic is performed once per trip of the internal combustion engine (that is once between a start and end of operation of the internal combustion engine) in response to certain entry conditions for the operation of the internal combustion engine having been met. The entry conditions relate to the approximate temperature of the sensor tip and, for example, conditions such as heater duty operation, accumulated load, engine speed, coolant temperature and atmospheric pressure.

In this example, monitoring of the HEGO sensor 48 is performed. However, in other examples the monitoring could instead, or in addition, be for the UHEGO sensor 52. Indeed, in other examples monitoring could be for one or more of pre-, mid- or post-catalyst sensors. Although in the present example, the response diagnostic is performed once per trip of the internal combustion engine, in other examples, the exhaust gas monitoring could be performed twice, or more times, or continuously during a trip.

If, in the current example, the HEGO response diagnostic is not currently being performed, then the normal, for example a sequential, fuel cut-off strategy can be used.

Alternatively, if the HEGO response diagnostic entry conditions are met, then, in accordance with step 82, an alternative sequential fuel cut-off strategy can be used as will be described in the following. In the example alternative fuel cut-off strategy, cylinders are cut based on a selected bank of cylinders one bank at a time.

At step 84, the alternatively sequential fuel cut-off strategy is responsive to a requested fuel cut-off level increasing (i.e., should fuel be cut to more cylinders). The request for increased fuel cut-off can be provided, for example, by the oxygen sensor monitor logic 57 determining that injection to an additional cylinder can be cut-off (and providing a fuel cut control request to the fuel cut-off control logic 76) while still maintaining operating conditions to enable the monitoring of the oxygen sensor. In response to a request for an increased fuel cut-off level and/or rate of cut, then, at step 86, the next available cylinder for a predetermined bank can be determined and an appropriate cylinder can be turned off. At step 88, the fuel cut-off level and/or the cylinder status can be reported.

FIG. 4 illustrates the fuel cut-off control logic 76, executable by the CPU 141, in more detail. This includes normal sequential fuel cut-off strategy request logic 59 that is operable to provide a fuel cut request when oxygen sensor monitoring is not being performed (i.e. during normal engine operation). In this situation, fuel cut interval determination logic 106 is operable to determine a fuel cut interval based on sensed vehicle operating parameters, e.g., on engine speed and gear position using a table look-up in a table (not shown) forming part of the fuel cut interval determination logic 106 in accordance with a predetermining mapping. In accordance with the fuel cut interval, a signal is issued to the fuel cut increment request logic 112 that signals the final injection control logic 114 to issue an injection cut signal to the final injection control signal logic 78 for the next cylinder to fire to cut injection to that cylinder. In this situation, the next cylinder to be cut may not be identified as such, but is effectively random subject to the fuel cut interval timing.

FIG. 4 also illustrates alternative diagnostic sequential fuel cut-off strategy request logic 90 that is operable to issue a fuel cut request when oxygen sensor monitoring is being performed. The alternative diagnostic sequential fuel cut-off strategy logic 90 causes the fuel cut interval to be determined by an alternative methodology implemented by the fuel cut determination logic, wherein the interval between cylinders (the fuel cut rate) is determined by an alternative table look-up in a table (not shown) forming part of the fuel cut determination logic 106 based on vehicle operating parameters, for example, engine speed as modified by gear position according to an alternative mapping. Cylinder identification is specifically identified in next cylinder identification logic 102 by determining the next cylinder to fire, and comparing it against the next appropriate cylinder to have fuel cut, taking into consideration the banks of the engine. When a match is made the fuel cut is incremented and a specific cylinder is identified and the final injection control unit 114 issues a fuel cut signal to the appropriate final injection control signal logic to cut fuel to that cylinder.

The alternative diagnostic sequential fuel cut-off strategy logic 90 can be operable to signal the fuel cut interval determination logic 106, and the fuel cut increment request logic 112. The fuel cut interval determination logic 106 and the fuel cut increment request logic 112 are operable to signal cylinder disable logic 108, which in turn is operable to signal the fuel cut increment request logic 112 and cylinder ID logic 110, which in turn signal the final injection control logic 114. The operation of these various logical elements will be described in more detail in the following.

In response to a fuel cut request from the alternative diagnostic sequential fuel cut request logic 90 (i.e., when the alternative sequential fuel cut-off strategy is active), the next cylinder identification logic 102 uses an output from a crank counter forming part of the ECU 40, which responds to pulses from the crank sensor 35, to determine a next cylinder to fire.

In the present example, the cylinders of the internal combustion engine are divided into bank 21 and bank 23. The bank delay control logic 104 is operable, in response to the fuel cut request from the alternative diagnostic sequential fuel cut request logic 90, to determine which cylinder is the next appropriate cylinder to be cut, taking into account a bank-by-bank fuel cut strategy. This can be determined from switchable timer logic that forms the bank delay control logic 104, and is configured to provide a cut-off strategy that minimizes the impact for the driver of the vehicle, while enabling the oxygen monitoring to continue. That is, it allows a fast fuel cut rate to be performed on one bank, followed by calibratable delay followed by fast fuel cut to second bank if required.

The cylinder disable logic 108 is operable to compare the cylinder identified by the next cylinder identification logic 102 and the delay between banks identified by the bank control delay logic 104. When there is a match between the next cylinder to fire determined by the next cylinder identification logic 102 and the cylinder that is the next appropriate cylinder to be cut as determined by the cylinder identification logic 102 taking into account any bank delay time determined by the bank delay control logic 104, the cylinder disable logic 108 is operable to signal the fuel cut increment request logic 112 to initiate a fuel cut increment request. The fuel cut increment request can signal the next increment (i.e., another cylinder) is to be cut. The cylinder disable logic 108 is also operable to signal the cylinder ID logic 110 to identify the cylinder to be cut to the final injection control logic 114 (for example, using a cylinder code held in the cylinder ID logic 110).

Figure 5:
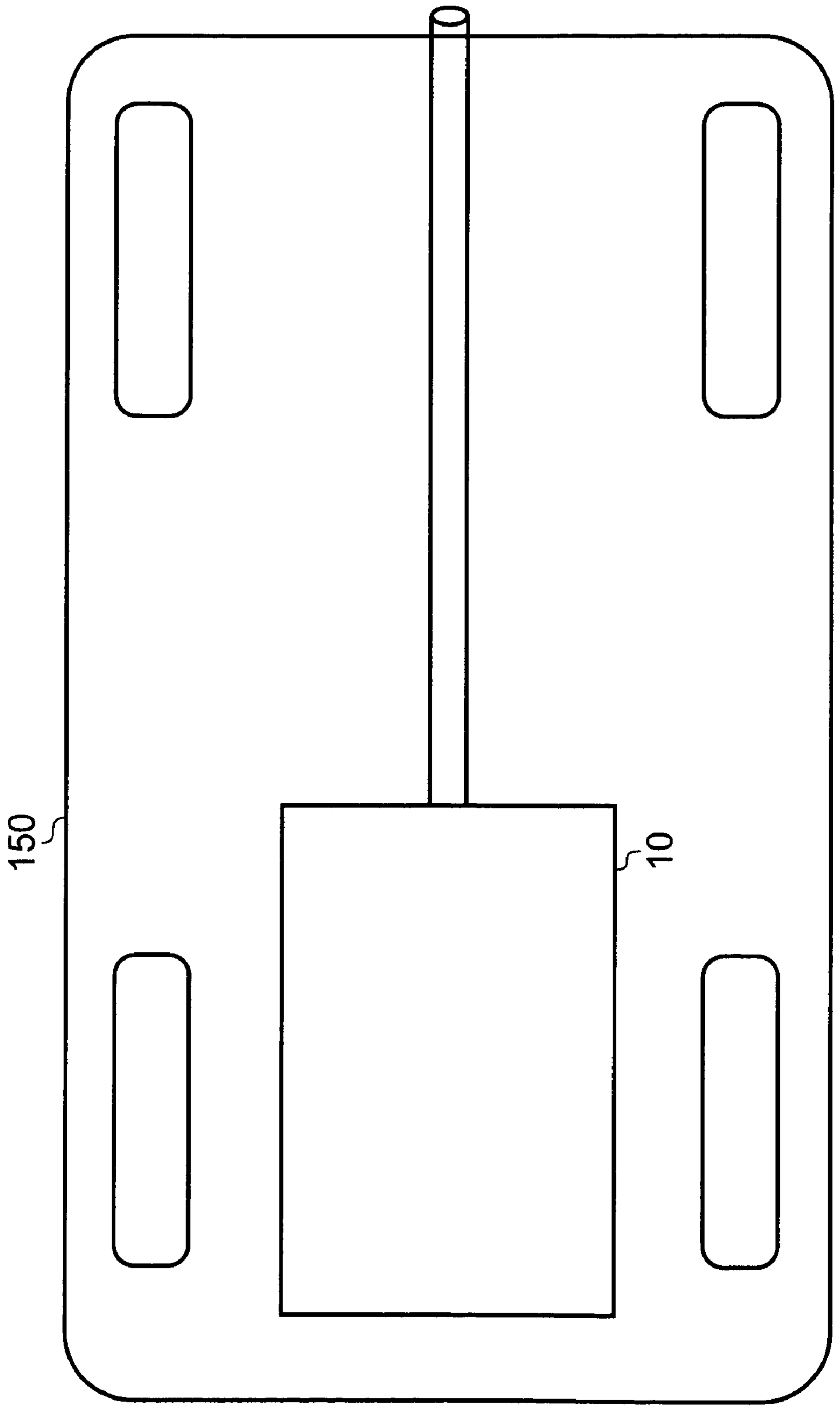
FIG. 5 is a schematic representation of a vehicle.

FIG. 5 is a schematic representation of a vehicle 150 comprising the engine system 10 illustrated in FIGS. 1-4.

An example embodiment of the invention can provide an internal combustion engine includes an exhaust system, an oxygen sensor in the exhaust system and a sensor malfunction monitor. In order to maintain operation during a fuel cut-off situation, the sensor malfunction monitor is arranged to control the fuel cut-off sequencing.

In an example embodiment of the invention, on entry to fuel cut when an oxygen sensor response diagnostic is requesting operation, a separate fuel cut strategy is selected to determine the rate of cylinder fuel cut. As the fuel cut level (number of cylinders entered into fuel cut) increases, a next cylinder to be cut is selected to enter fuel cut and is identified based on a bank by bank cut-off strategy. In one example, all of one bank is cut before all of another bank.

An example embodiment of the invention can comprise a computer readable storage medium, on which is stored program code for, upon read out and execution by a computer processor, controlling an engine management system to initiate an oxygen sensor monitor period in which an oxygen sensor is monitored and, during the oxygen sensor monitor period, to control a rate and sequence of fuel cut to cylinders in response to the oxygen sensor monitoring. The computer readable storage medium can, for example, comprise a portable storage medium separate from an engine control unit, or can form storage forming part of an engine control unit such as ROM 142 or RAM 143.

Although the example embodiments above have been described in considerable detail, numerous variations, alternative forms, and modifications will become apparent to those skilled in the art once the above disclosure is fully appreciated. It should be understood, however, that the foregoing drawings and detailed description of example embodiments are not intended to limit the present invention to the particular form disclosed. To the contrary, the invention is to cover all modifications, equivalents and alternatives falling within the spirit and scope of the present invention as defined by the appended claims. That is, it is intended that the following claims be interpreted to embrace all such variations and modifications as well as their equivalents.

What is claimed is:

1. A method of managing internal combustion engine operation for sensor monitoring, the method comprising:

initiating an oxygen sensor monitor period in which an oxygen sensor is monitored; and during the sensor monitor period, controlling a rate and sequence of fuel cut to cylinders of a selected bank of the internal combustion engine in response to the oxygen sensor monitoring.

2. The method of claim 1, wherein the fuel cut to the cylinders is performed in a predetermined order.

3. The method of claim 1, wherein the fuel cut to the cylinders is performed in a controlled manner for one bank of cylinders at a time.

4. The method of claim 1, wherein the oxygen sensor monitor period is initiated by oxygen sensor monitor logic and the control of the rate and sequence of the fuel cut to the cylinders of the selected bank of the internal combustion engine is performed by a injection control logic responsive to the oxygen sensor monitor logic, the oxygen sensor monitor logic and the injection control logic being executed by a computer processor.

5. An engine control unit for an internal combustion engine, the engine control unit comprising: a computer processor which executes injection control logic and oxygen sensor monitor logic, wherein:

the engine control unit, in response to initiation of an oxygen sensor monitor period in which an oxygen sensor is monitored by execution of the oxygen sensor monitor logic by the computer processor, is operable during the oxygen sensor monitor period, to control a rate and sequence of fuel cut to cylinders of a selected bank of the internal combustion engine by execution of the injection control logic by the computer processor in response to the oxygen sensor monitoring.

6. The engine control unit of claim 5, wherein the engine control unit is operable to perform fuel cut to cylinders in a predetermined order.

7. The engine control unit of claim 5, wherein the engine control unit is operable to perform fuel cut to cylinders in a controlled manner for one bank of cylinders at a time.

8. The engine control unit of claim 5, wherein the oxygen sensor monitor logic, upon execution by the computer processor, is operable to initiate the oxygen sensor monitor period and to monitor the oxygen sensor; and wherein the injection control logic, upon execution by the computer processor, is responsive to the oxygen sensor monitor logic to control of the rate and sequence of the fuel cut to the cylinders of the selected bank of the internal combustion engine.

9. The engine control unit of claim 5 wherein the engine control unit includes a computer readable storage medium for storing the injection control logic and the oxygen sensor monitor logic.

10. An internal combustion engine system comprising:

an internal combustion engine having a plurality of banks of cylinders; and an engine control unit, the engine control unit comprising a computer processor for executing injection control logic and oxygen sensor monitor logic, wherein:

the engine control unit, in response to initiation of a sensor monitor period in which a sensor is monitored by execution of the oxygen sensor monitor logic by the computer processor, is operable during the oxygen sensor monitor period, to control a rate and sequence of fuel cut to a selected one of the plurality of banks of cylinders of the internal combustion engine by execution of the injection control logic by the computer processor in response to the oxygen sensor monitoring.

11. The internal combustion engine system of claim 10, wherein at least one oxygen sensor is provided for each bank of cylinders.

12. The internal combustion engine system of claim 10, wherein the engine control unit is operable to perform the fuel cut to the cylinders in a predetermined order.

13. The internal combustion engine system of claim 10, wherein the engine control unit is operable to cut fuel to the cylinders in a controlled manner for one bank of cylinders at a time.

14. The internal combustion engine system of claim 10, wherein the oxygen sensor monitor logic, upon execution by the computer processor, is operable to initiate the oxygen sensor monitor period and to monitor the oxygen sensor and wherein the injection control logic, upon execution by the computer processor, is responsive to the oxygen sensor monitor logic to control of the rate and sequence of the fuel cut to the cylinders of a selected bank of the internal combustion engine.

15. The internal combustion engine system of claim 9 wherein the engine control unit includes a computer readable storage medium for storing the injection control logic and the oxygen sensor monitor logic.

16. A computer readable storage medium readable by a computer, tangibly storing program code executable by a computer processor to perform a method for managing internal combustion engine operation for oxygen sensor monitoring, the method comprising:

initiating a sensor monitor period in which an oxygen sensor is monitored and;

during the sensor monitor period, controlling a rate and sequence of fuel cut to a selected bank of cylinders of the internal combustion engine in response to the oxygen sensor monitoring.

17. The computer readable storage medium of claim 16, wherein the computer readable storage medium is a component of a vehicle engine control unit which includes the computer processor for reading out and executing the program code.

18. The computer readable storage medium of claim 16, wherein the computer readable storage medium is a portable computer readable storage medium external to a vehicle engine control unit which includes the computer processor for reading out and executing the program code.

19. The computer readable storage medium of claim 16, wherein the computer readable storage medium tangibly stores program code executable by the computer processor which enables the fuel cut to the cylinders to be performed in a predetermined order.

20. The computer readable storage medium of claim 16, wherein the computer readable storage medium tangibly stores program code executable by the computer processor which enables the fuel cut to the cylinders to be performed in a controlled manner for one bank of cylinders at a time.

21. The computer readable storage medium of claim 16, wherein the computer readable storage medium tangibly stores program code executable by the computer processor which enables the oxygen sensor monitor period to be initiated by oxygen sensor monitor logic and the control of the rate and sequence of the fuel cut to the selected bank of cylinders to be performed by an injection control logic responsive to the oxygen sensor monitor logic, the oxygen sensor monitor logic and the injection control logic being program code executed by the computer processor.

* * * * *